W. L. MONRO.
METHOD OF AND APPARATUS FOR DRAWING GLASS SHEETS.
APPLICATION FILED MAR. 4, 1911.
1,164,007.
Patented Dec. 14, 1915.
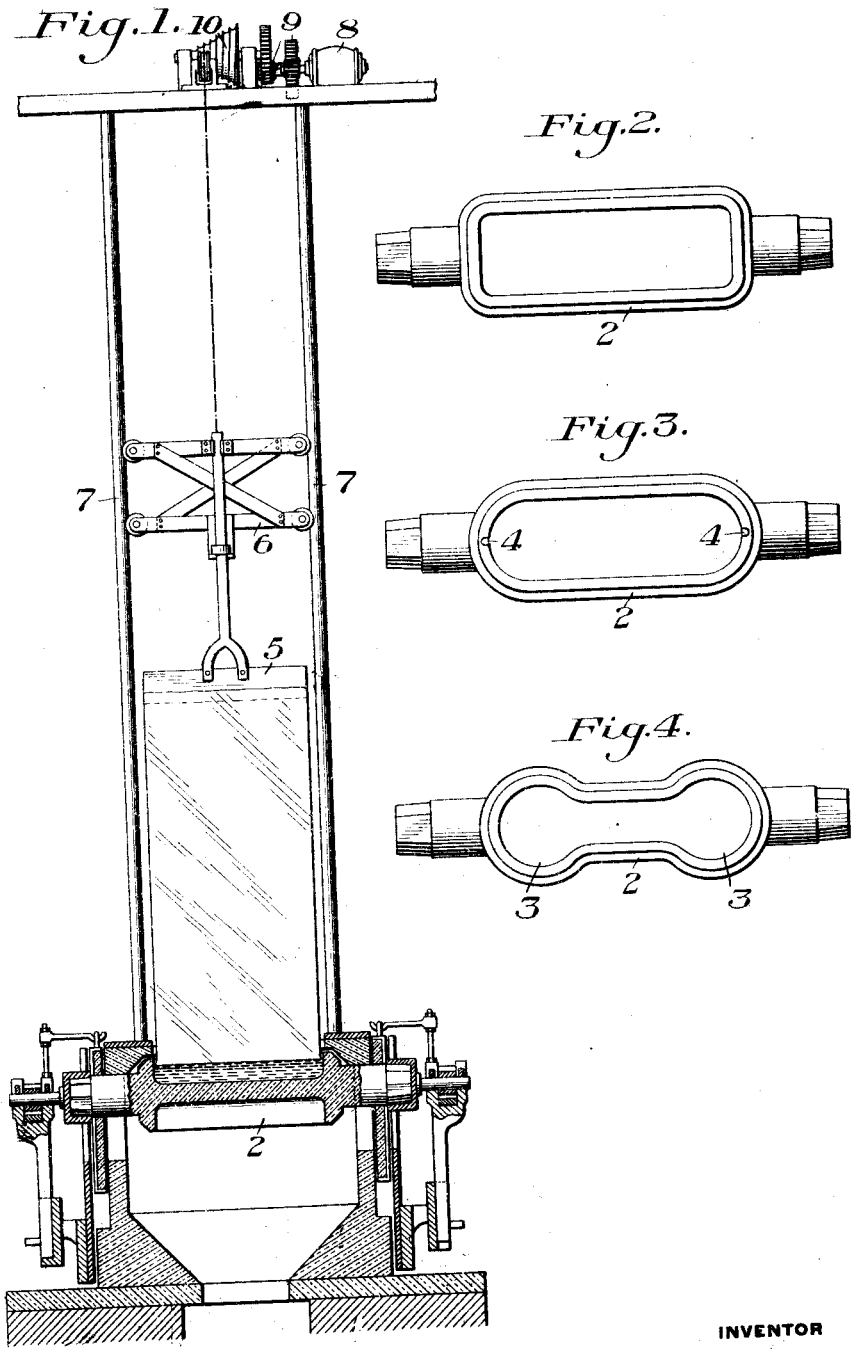
WITNESSES
R A Balderson
Jesse B. Heller
INVENTOR
Wm L. Monro,
by Bakewell, Byrnes Parmelee
Attys

UNITED STATES PATENT OFFICE.

WILLIAM L. MONRO, OF PITTSBURGH, PENNSYLVANIA, ASSIGNOR TO WINDOW GLASS MACHINE COMPANY, OF PITTSBURGH, PENNSYLVANIA, A CORPORATION OF NEW JERSEY

METHOD OF AND APPARATUS FOR DRAWING GLASS SHEETS.

1,164,007. Specification of Letters Patent. Patented Dec. 14, 1915.

Application filed March 4, 1911. Serial No. 612,306.

*To all whom it may concern:*

Be it known that I, WILLIAM L. MONRO, of Pittsburgh, Allegheny county, Pennsylvania, have invented a new and useful Method of and Apparatus for Drawing Glass Sheets, of which the following is a full, clear, and exact description, reference being had to the accompanying drawing, in which—

Figure 1 is a view partly in front elevation, and partly in vertical section, of glass-drawing apparatus suitable for carrying out my invention; and Figs. 2, 3 and 4 are plan views of different forms of drawing pots which may be employed.

My invention is designed to provide a novel and practical method of drawing sheets of glass. Various attempts have been made prior to my invention to draw glass in sheet form; but insofar as I am aware, all such attempts have proved unsuccessful, for a number of different reasons. In these attempts, it has been customary to flow the glass more or less continuously from a melting tank or furnace into a drawing pot or vessel, and to maintain a continuous draw. The resulting glass has not been of commercial character, due to the fact that it is "ropy," streaked or corrugated. This defect in the glass I believe to be due to the fact that when the glass is flowed in this manner from a furnace into a drawing vessel, it is practically impossible to maintain the body of glass from which the draw is made of uniform temperature and character, and the slight variations which necessarily occur produce the serious defects above noted. A further difficulty has been the tendency of the glass sheets to draw thicker at the edges of the sheets, and also to "draw to a point."

My present invention is designed to overcome these difficulties and to provide a method of drawing glass sheets which is commercially practical.

In accordance with my invention I employ a reversible drawing pot 2, which is of the general character shown in the patent to Lincoln Thornburg No. 759,329 of May 10th, 1904, that is to say, it contains a plurality of pot cavities which can be successively moved into drawing position while the previously used cavity is being drained or freed from the residue of glass left from the drawing operation. The pot is, however, made of general rectangular form, with a relatively narrow drawing opening, such as shown in either Figs. 2, 3 or 4; and its form may be varied so as to provide for varying volumes of glass at different places in the pot. Thus, the pot may be made deeper, or wider at its ends than its central portion, so as to provide greater bodies of glass at these points, or it may be shaped in various other ways, the purpose being in all cases to provide a sufficient body of glass where needed to fill out the edges of the sheet, while at the same time preventing the formation of beaded or thickened edges, and tending to produce uniformity in thickness.

In Fig. 4 I have shown a form of pot which is formed with enlargements 3 at its ends. The form shown in Fig. 2 is generally oval shaped, and is preferably provided with a small vertical groove 4 at each end into which the glass may draw to prevent the formation of a thick bead at the edges thereof. This same expedient may be applied to the rectangular form of pot shown in Fig. 2.

5 designates a suitable bait carried by the carriage 6 mounted to travel on guides 7, and actuated by an electric motor 8. This motor may be made to actuate the carriage through the gears 9 and spiral drum 10, the latter providing means for varying the speed of draw.

I also, in accordance with my invention, instead of attempting to make a continuous draw, draw sheets of relatively short lengths, provide a fresh drawing cavity and batch of glass for each drawal, and ladle the glass for each batch directly from the melting tank or furnace into the drawing pot. In this ladling operation, care is taken that the outer portions or "skin" of glass in the ladle are not emptied into the drawing pot. In this manner I provide for each drawing operation, a relatively small body of glass, which, by the usual application of heat to the drawing pot, can be kept at the proper degree of temperature throughout the drawing operation. I also prefer to increase the speed of the draw as shown, for instance, in Fig. 1, which increase may be effected either by hand regulation, or automatically, during the drawing operation, in order to secure still greater uniformity in the thickness of the glass. By carrying out the operation in this manner, I overcome the difficulties which have heretofore been experienced, and enable glass of commercial character to be drawn in sheet form.

In order to the successful carrying out of my invention, a drawing pot of the character above described is preferable, so that a fresh and properly cleaned pot cavity may be provided for each drawing operation. I do not wish to necessarily limit myself to a reversible pot of the character described, since other forms of pot known in the art may be employed which will answer the purpose. The sheets may be drawn singly, or a plurality of sheets may be simultaneously drawn.

What I claim is:—

1. The herein described method of drawing glass sheets, which consists in ladling a relatively small quantity of molten glass into a drawing receptacle, and then drawing a relatively short sheet directly upward from such receptacle while maintaining a different volume of glass at different points across the width of the sheet, substantially as described.

2. The herein described method of drawing glass sheets, which consists in ladling a relatively small quantity of molten glass into a drawing receptacle, disposing the glass in said receptacle to provide a varying cross section of the volume of the molten glass at different points across the width of the sheet being drawn, and then drawing a relatively short sheet directly upward from such receptacle, substantially as described.

3. The herein described method of drawing glass sheets, which consists in ladling a relatively small quantity of molten glass into a drawing receptacle, disposing the glass in said receptacle to provide a greater volume of glass adjacent to the edge portions of the sheet than at the intermediate portion, and then drawing a relatively short sheet directly upward from such receptacle, substantially as described.

4. The herein described method of drawing glass sheets, which consists in ladling a relatively small quantity of molten glass into a drawing receptacle, then drawing a relatively short sheet directly upward from such receptacle while maintaining a different volume of glass at different points across the width of the sheet, and applying heat to the glass in the receptacle during the draw, substantially as described.

5. The herein described method of drawing glass sheets, which consists in ladling a relatively small quantity of molten glass into a drawing receptacle, then drawing a relatively short sheet directly upward from such receptacle while maintaining a different volume of glass at different points across the width of the sheet, and increasing the speed of the draw during the drawing operation, substantially as described.

6. The herein described method of drawing glass sheets, which consists in drawing relatively short lengths successively from different drawing receptacles, prior to each drawing operation providing a clean drawing receptacle, and ladling into such receptacle a batch of molten glass free from skin and just sufficient for that particular operation, substantially as described.

7. A glass drawing pot, having a narrow oblong cavity whose end walls are laterally recessed; substantially as described.

In testimony whereof, I have hereunto set my hand.

WILLIAM L. MONRO.

Witnesses:
ALICE A. TRILL,
ROBT. J. WHALEN.